(12) United States Patent
Kwon et al.

(10) Patent No.: US 9,698,630 B2
(45) Date of Patent: Jul. 4, 2017

(54) METHOD AND APPARATUS FOR WIRELESS ENERGY RECEPTION USING HYBRID SYNCHRONIZATION

(71) Applicant: Samsung Electronics Co., Ltd., Suwon-si (KR)

(72) Inventors: Ui Kun Kwon, Hwaseong-si (KR); Sang Joon Kim, Hwaseong-si (KR); Seung Keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 14/449,368

(22) Filed: Aug. 1, 2014

(65) Prior Publication Data

US 2015/0035379 A1 Feb. 5, 2015

(30) Foreign Application Priority Data

Aug. 1, 2013 (KR) ........................ 10-2013-0091431

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H04B 5/00* | (2006.01) |
| *H02J 7/02* | (2016.01) |
| *G01B 7/14* | (2006.01) |
| *G01S 11/06* | (2006.01) |
| *H02J 50/12* | (2016.01) |

(52) U.S. Cl.
CPC .............. *H02J 50/10* (2016.02); *H02J 7/025* (2013.01); *H04B 5/0037* (2013.01); *H04B 5/0081* (2013.01); *G01B 7/14* (2013.01); *G01S 11/06* (2013.01); *H02J 50/12* (2016.02)

(58) Field of Classification Search
CPC .. H02J 5/005; H02J 7/025; H02J 17/00; H02J 50/10; H04B 5/0037; H01F 38/14
USPC ........................................................ 307/104
See application file for complete search history.

(56) References Cited

U.S. PATENT DOCUMENTS

| | | | |
|---|---|---|---|
| 6,559,689 B1 | 5/2003 | Clark | |
| 2012/0112555 A1* | 5/2012 | Toshimitsu | ............. H02J 5/005 307/104 |

FOREIGN PATENT DOCUMENTS

| | | |
|---|---|---|
| JP | 2000-341114 A | 12/2000 |
| JP | 2010-154497 A | 7/2010 |
| KR | 2002-0082642 A | 10/2002 |
| KR | 10-2006-0047806 A | 5/2006 |
| KR | 10-2012-0109643 A | 10/2012 |
| KR | 10-2013-0033704 A | 4/2013 |

* cited by examiner

*Primary Examiner* — Carlos Amaya
(74) *Attorney, Agent, or Firm* — NSIP Law

(57) ABSTRACT

A wireless energy reception apparatus includes a target resonator configured to receive energy on a frame-by-frame basis from an energy transmission end through a resonance with a source resonator in a symbol duration constituting a criterion for transmitting energy from the energy transmission end to an energy reception end; a load end configured to receive power from the target resonator; a switching unit configured to connect the target resonator to the load end, and disconnect the target resonator from the load end; and a controller configured to control symbol synchronization by detecting a start point of a symbol based on a distance between the source resonator and the target resonator.

23 Claims, 11 Drawing Sheets

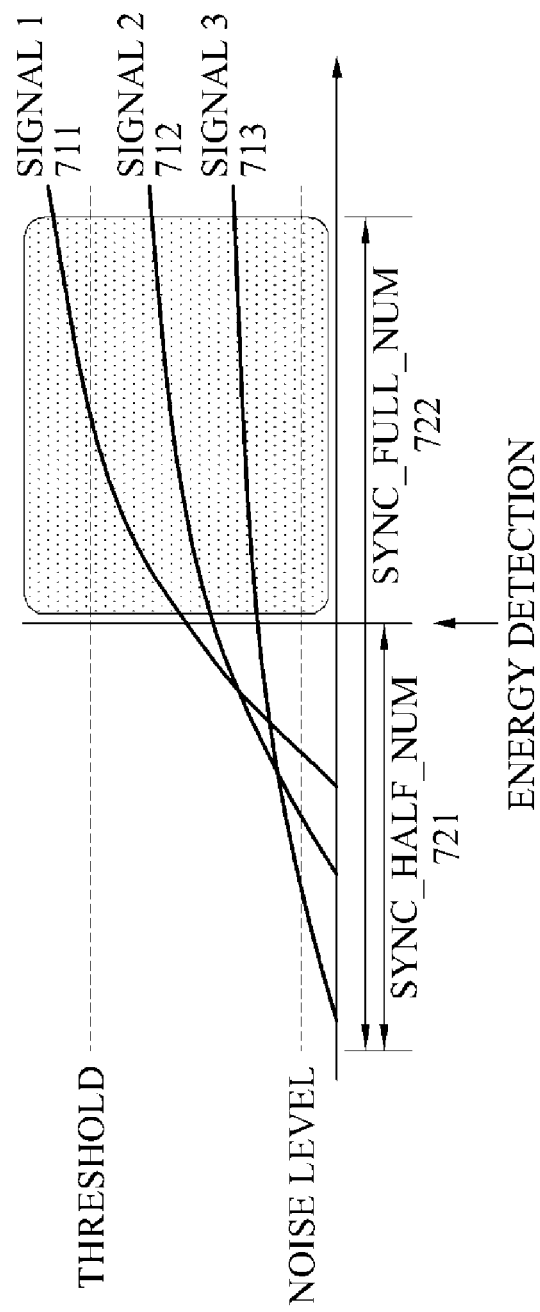

METHOD AND APPARATUS FOR WIRELESS ENERGY RECEPTION USING HYBRID SYNCHRONIZATION

CROSS-REFERENCE TO RELATED APPLICATIONS

This application claims the benefit under 35 USC 119(a) of Korean Patent Application No. 10-2013-0091431 filed on Aug. 1, 2013, in the Korean Intellectual Property Office, the entire disclosure of which is incorporated herein by reference for all purposes.

BACKGROUND

1. Field

The following description relates to a method and apparatus for wireless energy reception using hybrid synchronization.

2. Description of Related Art

Due to an increase in various electronic devices, including mobile devices, research on wireless power transmission has been initiated in an effort to overcome various issues, such as an increasing inconvenience of wired power supplies, and limits to existing battery capacities. In particular, research has been concentrated on near-field wireless power transmission. Near-field wireless power transmission refers to wireless power transmission in which a distance between a transmission coil and a reception coil is relatively short compared to a wavelength at an operation frequency. In the near-field wireless power transmission, a resonator isolation (RI) system may be used. The RI system using resonance characteristics may include a source configured to supply power and a target configured to receive the supplied power. When wireless power is transmitted and received, the source and the target may share control information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless energy reception apparatus includes a target resonator configured to receive energy on a frame-by-frame basis from an energy transmission end through a resonance with a source resonator in a symbol duration constituting a criterion for transmitting energy from the energy transmission end to an energy reception end; a load end configured to receive power from the target resonator; a switching unit configured to connect the target resonator to the load end, and disconnect the target resonator from the load end; and a controller configured to control symbol synchronization by detecting a start point of a symbol based on a distance between the source resonator and the target resonator.

The controller may include an energy frame detector configured to detect an energy frame based on a magnitude of energy received during a first period of time; a distance determiner configured to determine the distance between the source resonator and the target resonator based on a magnitude of energy received during a second period of time in response to the energy frame being detected; and a symbol start point detector configured to detect the start point of the symbol based on the distance between the source resonator and the target resonator.

The distance determiner may be further configured to determine that the distance between the source resonator and the target resonator is relatively short in response to the magnitude of the energy received during the second period of time being greater than or equal to a first threshold value; and determine that the distance between the source resonator and the target resonator is relatively long in response to the magnitude of the energy received during the second period of time being less than the first threshold value.

The symbol start point detector may be further configured to estimate a first point in time at which a magnitude of the energy received by the target resonator is equal to a second threshold value to be the start point of the symbol in response to the distance determiner determining that the distance between the source resonator and the target resonator is relatively short.

The switching unit may be further configured to disconnect the target resonator from the load end in response to the distance determiner determining that the distance between the source resonator and the target resonator is relatively long; and repeatedly connect the target resonator to the load end and disconnect the target resonator from the load end within the symbol duration in response to the distance determiner determining that the distance between the source resonator and the target resonator is relatively short.

The distance determiner may be further configured to determine the distance between the source resonator and the target resonator based on a magnitude of energy received during an end portion of the second period of time.

The symbol start point detector may include a symbol start point corrector configured to correct the detected start point of the symbol by a predetermined period of time.

The symbol start detector may include an envelope detector configured to detect an envelope of the energy received by the target resonator; and a slope calculator configured to calculate a slope of the detected envelope; and the symbol start point detector may be further configured to estimate a point in time at which the calculated slope of the envelope has a maximum value to be the start point of the symbol in response to the distance determiner determining that the distance between the source resonator and the target resonator is relatively long.

The symbol start point detector may be further configured to detect the start point of the symbol based on the energy received during the second period of time.

The energy frame may include a preamble including advance information to be used for receiving the energy frame by the energy reception end; a start of frame (SoF) indicating a start of the preamble; an energy frame header (EFH) including control information; an energy frame body (EFB) including energy received by the energy reception end; and a data frame (DF) inserted in the EFB in a super-frame structure.

The second period of time may include the first period.

The load end may include a load configured to be charged with the energy received by the target resonator in response to the switching unit connecting the target resonator to the load end; and a capacitor configured to change a resonant frequency of the target resonator in response to the switching unit connecting the target resonator to the load end.

In another general aspect, a wireless energy receiving method includes receiving energy on a frame-by-frame basis from an energy transmission end through a resonance between a source resonator and a target resonator in a symbol duration constituting a criterion for transmitting energy from the energy transmission end to an energy reception end; and controlling symbol synchronization by detecting a start point of a symbol based on a distance between the source resonator and the target resonator.

The controlling of the symbol synchronization may include detecting an energy frame based on a magnitude of energy received during a first period of time; determining the distance between the source resonator and the target resonator based on a magnitude of energy received during a second period of in response to the energy frame being detected; and detecting the start point of the symbol based on the distance between the source resonator and the target resonator.

The determining of the distance may include determining that the distance between the source resonator and the target resonator is relatively short in response to the magnitude of the energy received during the second period of time being greater than or equal to a first threshold value; and determining that the distance between the source resonator and the target resonator is relatively long in response to the magnitude of the energy received during the second period of time being less than the first threshold value.

The detecting of the start point of the symbol may include estimating a first point in time at which a magnitude of the energy received by the target resonator is equal to a second threshold value to be the start point of the symbol in response to the distance between the source resonator and the target resonator being determined to be relatively short.

The method may further include detecting an envelope of the energy received by the target resonator; and calculating a slope of the detected envelope; and the detecting of the start point of the symbol may include estimating a point in time at which the calculated slope of the envelope has a maximum value to be the start point of the symbol in response to the distance between the source resonator and the target resonator being determined to be relatively long.

The determining of the distance may include determining the distance between the source resonator and the target resonator based on a magnitude of energy received during an end portion of the second period of time.

The detecting of the start point of the symbol may include correcting the detected start point of the symbol by a predetermined period of time.

The detecting of the start point of the symbol may include detecting the start point of the symbol based on the energy received during the second period of time.

In another general aspect, a wireless energy reception apparatus includes a target resonator configured to be charged by receiving energy in frame units through a resonance with a source resonator; and discharged by transferring energy to a load, a single charging and discharging of the target resonator constituting a single symbol; and a controller configured to detect a start point of a symbol based on a distance between the source resonator and the target resonator.

The controller may be further configured to detect the start point of the symbol based on a first point in time at which a magnitude of the energy received by the target resonator becomes equal to a predetermined threshold in response to the distance between the source resonator and the target resonator being relatively short.

The controller may be further configured to detect the start point of the symbol based on a slope of an envelope of the energy received by the target resonator in response to the distance between the source resonator and the target resonator being relatively long.

Other features and aspects will be apparent from the following detailed description, the drawings, and the claims.

BRIEF DESCRIPTION OF THE DRAWINGS

FIG. 7 illustrates an example of an energy frame detector and a distance determiner of a wireless energy reception apparatus.

DETAILED DESCRIPTION

Figure 1:
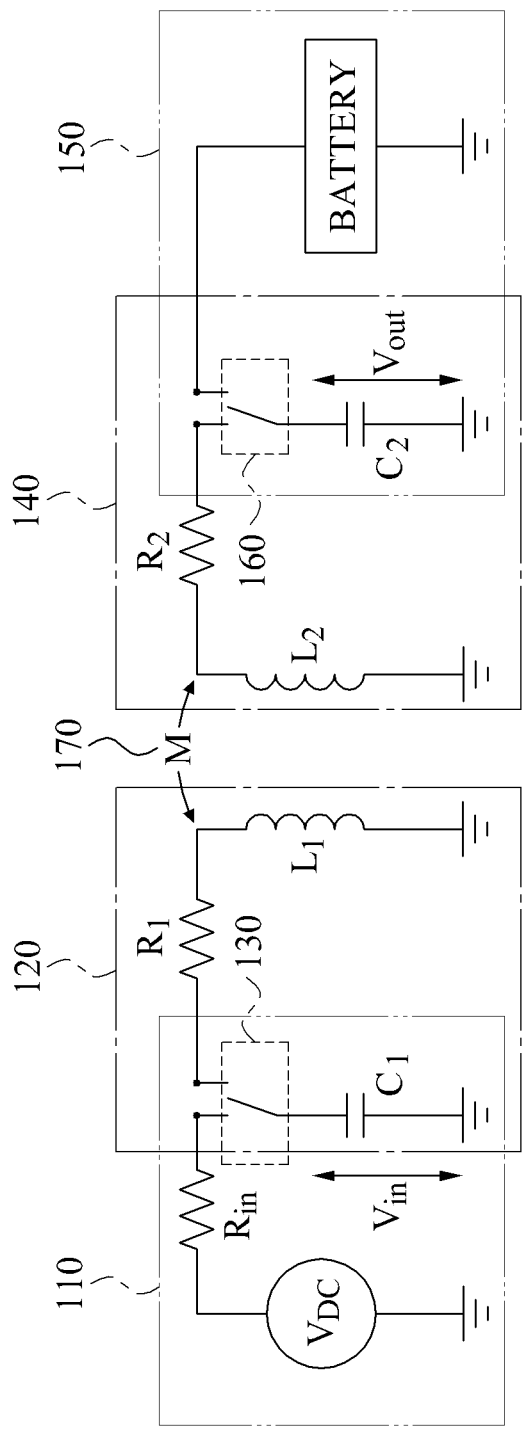
FIG. 1 illustrates an example of an equivalent circuit of a wireless energy transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

A wireless energy transmission system may be applied to various systems requiring wireless energy. The wireless energy transmission system may be used in a system enabling use of wireless energy, for example, a mobile device, a wireless television (TV), and other wireless devices. In addition, the wireless energy transmission system may be applied in a bio-healthcare field, may be used to remotely transmit power to a device inserted into a human body, and may be used to wirelessly transmit power to a bandage-shaped device for measurement of a heart rate.

The wireless energy transmission system may also be applied to a device, for example, a low-power sensor, operating using a relatively small amount of power and with a relatively low power consumption.

Additionally, the wireless energy transmission system may be used to remotely control an information storage device without a power source. The wireless energy transmission system may further be applied to a system that simultaneously supplies power to an information storage device to remotely operate the information storage device, and wirelessly requests information stored in the information storage device.

The wireless energy transmission system may receive energy supplied from a power supply unit and store the energy in a source resonator to generate a signal. The wireless energy transmission system may power off a switch electrically connecting the power supply unit to the source resonator to induce the source resonator to self-resonate. When a target resonator having the same resonant frequency as the source resonator is disposed within a distance close enough to mutually resonate with the self-resonating source resonator, a mutual resonance may occur between the source resonator and the target resonator. The source resonator may be a resonator that receives energy from a power supply unit, and the target resonator may be a resonator that receives energy from the source resonator through the mutual resonance.

The wireless energy transmission system may be defined as a resonator isolation (RI) system.

FIG. 1 illustrates an example of an equivalent circuit of a wireless energy transmission system. FIG. 1 illustrates an example of an RI system corresponding to, for example, a capacitive charging (CC) scheme.

Referring to FIG. 1, the wireless energy transmission system has a source-target structure including a source and a target. The wireless energy transmission system includes a wireless energy transmission apparatus corresponding to the source, and a wireless energy reception apparatus corresponding to the target.

The wireless energy transmission apparatus includes a power input unit 110, a power transmitting unit 120, and a switching unit 130. The power input unit 110 stores energy in a capacitor $C_1$ using a power supply unit. The switching unit 130 connects the capacitor $C_1$ to the power input unit 110 while the energy is being stored in the capacitor $C_1$. In addition, the switching unit 130 disconnects the capacitor $C_1$ from the power input unit 110 and connects the capacitor $C_1$ to the power transmitting unit 120 while the energy stored in the capacitor $C_1$ is being discharged. In particular, the switching unit 130 prevents the capacitor $C_1$ from being connected to the power input unit 110 and the power transmitting unit 120 at the same time.

The power transmitting unit 120 transfers electromagnetic energy to a receiving unit 140. In particular, the power transmitting unit 120 transfers power through a mutual resonance between a source resonator of the power transmitting unit 120 and a target resonator of the receiving unit 140. In this example, the source resonator includes the capacitor $C_1$ and a transmission coil $L_1$, and the target resonator includes a capacitor $C_2$ and a reception coil $L_2$. A level of the mutual resonance between the source resonator and the target resonator is affected by a mutual inductance M 170 between the transmission coil and the reception coil.

The power input unit 110 may be modeled by an input voltage $V_{DC}$, an internal resistor $R_{in}$, and the capacitor $C_1$, and the power transmitting unit 120 may be modeled by circuit elements $R_1$, $L_1$, and $C_1$. The switching unit 130 may be modeled by at least one switch. The capacitor $C_1$ may be considered to be part of the power input unit 110 or the power transmitting unit 120, depending an operation of the switching unit 130. For example, a switch may include an active element enabling an on/off function. In FIG. 1, R, L, and C represent a resistance, an inductance, and a capacitance, respectively. A voltage applied to the capacitor $C_1$ among the input voltage $V_{DC}$ is represented by V.

In FIG. 1, the wireless energy reception apparatus includes the receiving unit 140, a power output unit 150, and a switching unit 160. The receiving unit 140 receives electromagnetic energy from the power transmitting unit 120, and stores the received electromagnetic energy in the connected capacitor $C_2$. The switching unit 160 connects the capacitor $C_2$ to the receiving unit 140 to store energy in the capacitor $C_2$. Further, the switching unit 160 disconnects the capacitor $C_2$ from the receiving unit 140 and connects the capacitor $C_2$ to the power output unit 150 to transfer the energy stored in the capacitor $C_2$ to a load. In particular, the switching unit 160 prevents the capacitor $C_2$ from being connected to the receiving unit 140 and the power output unit 150 at the same time.

The reception coil $L_2$ of the receiving unit 140 receives power through a mutual resonance with the transmission coil $L_1$ of the power transmitting unit 120. The received power is used to charge the capacitor $C_2$ connected to the reception coil $L_2$. The power output unit 150 may transfer the power used to charge the capacitor $C_2$ to a battery. As another example, the power output unit 150 may transfer the power to the load or a target device, instead of the battery.

The receiving unit 140 is modeled by circuit elements $R_2$, $L_2$, and $C_2$, and the power output unit 150 is modeled by the connected capacitor $C_2$ and the battery. The switching unit 160 may be modeled by at least one switch. The capacitor $C_2$ may be considered to be part of the receiving unit 140 or the power output unit 150, depending on an operation of the switching unit 160. A voltage applied to the capacitor $C_2$ among energy received by the reception coil $L_2$ is represented by $V_{out}$.

The RI system enables power to be transmitted in an example in which the power input unit 110 is physically separated from the power transmitting unit 120 and the receiving unit 140 is physically separated from the power output unit 150. The RI system may have various differences in comparison to a conventional power transmission method using impedance matching. For example, the RI system may not need a power amplifier, because power may be supplied from a direct current (DC) source directly to a source resonator. Further, the RI system may not require a rectifying operation of a rectifier, because energy is captured from power that is used to charge a capacitor of a receiving unit in order to charge a battery. Furthermore, a transmission efficiency is not sensitive to a change in a distance between a transmission (Tx) end and a reception (Rx) end, because there is no need to perform impedance matching. Accordingly, the RI system may be easily extended to a wireless energy transmission system including a plurality of Tx ends and a plurality of Rx ends.

Figure 2:
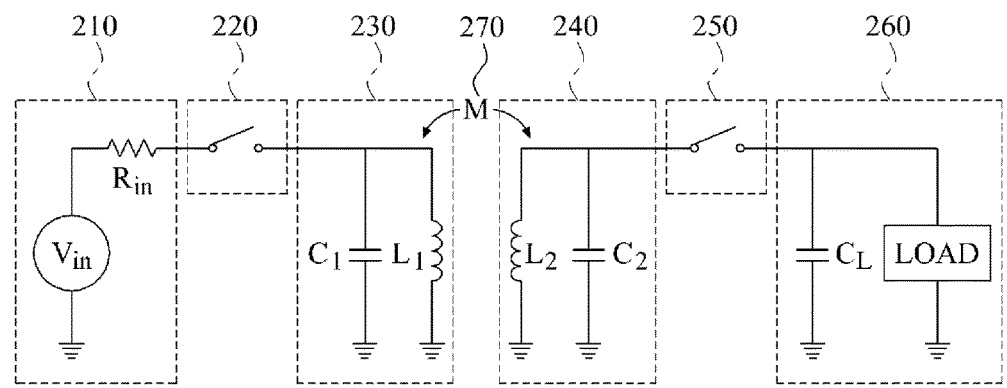
FIG. 2 illustrates another example of an equivalent circuit of a wireless energy transmission system.

FIG. 2 illustrates another example of an equivalent circuit of a wireless energy transmission system. FIG. 2 illustrates another example of an RI system corresponding to, for example, an inductive charging (IC) scheme.

Referring to FIG. 2, the wireless energy transmission system has a source-target structure including a source and a target. The wireless energy transmission system includes a wireless energy transmission apparatus corresponding to the source, and a wireless energy reception apparatus corresponding to the target.

The wireless energy transmission apparatus includes a power charging unit 210, a controller 220, and a transmitting unit 230. In this example, the power charging unit 210 includes a power supply unit $V_{in}$ and an internal resistor $R_{in}$. In FIG. 2, a capacitor $C_1$ and an inductor $L_1$ may be referred to as a source resonator. In this example, the source resonator corresponds to the transmitting unit 230. The transmitting unit 230 transmits energy stored in the source resonator to the wireless energy reception apparatus through a mutual resonance between the source resonator and a target resonator. The controller 220 turns on a switch to enable power to be supplied from the power charging unit 210 to the source resonator. A voltage may be applied from the power supply unit $V_{in}$ to the capacitor $C_1$, and a current may be applied to the inductor $L_1$. For example, when the source resonator reaches a steady state, the voltage applied to the capacitor $C_1$ may have a value of 0 volts (V), and the current flowing in the inductor $L_1$ may have a value of $V_{in}/R_{in}$ V. In the steady state, the inductor $L_1$ may be charged with power using the current applied to the inductor $L_1$.

For example, when the power used to charge the source resonator in the steady state reaches a predetermined value, the controller 220 turns off the switch. Information on the predetermined value may be preset by the controller 220. When current flowing into the transmitting unit 230 is the same as a predetermined target current, the controller 220 may turn off the switch.

Based on an operation of the switch, the power charging unit 210 may be disconnected from the transmitting unit 230. In this example, when the switch is turned off, the source resonator self-resonates between the capacitor $C_1$ and the inductor $L_1$. Energy stored in the source resonator is transferred to the target resonator through a mutual resonance between the source resonator and the target resonator affected by a mutual inductance M 270 between the inductor $L_1$ of the source resonator and an inductor $L_2$ of the target resonator. A resonant frequency $f_1$ of the source resonator may be the same as a resonant frequency $f_2$ of the target resonator. The resonant frequencies $f_1$ and $f_2$ may be calculated using the following Equation 1.

$$f_1 = \frac{1}{2\pi\sqrt{L_1 C_1}}, \qquad (1)$$

$$f_2 = \frac{1}{2\pi\sqrt{L_2 C_2}}$$

The wireless energy reception apparatus includes a charging unit 240, a controller 250, and a power output unit 260. In FIG. 2, a capacitor $C_2$ and an inductor $L_2$ may be referred to as a target resonator. The target resonator corresponds to the charging unit 240. During a mutual resonance between the source resonator and the target resonator, the source resonator is disconnected from the power supply unit $V_{in}$, and the target resonator is disconnected from a load and a capacitor $C_L$. The capacitor $C_2$ and the inductor $L_2$ of the charging unit 240 are charged with power through the mutual resonance. To charge the target resonator with power, the controller 250 may turn off a switch (i.e., open a switch). For example, when the switch is turned off, the source resonator and the target resonator may resonate with each other because the target resonator has the same resonant frequency as the source resonator. When the power used to charge the target resonator reaches a predetermined value, the controller 250 may turn on the switch (i.e., close the switch). Information on the predetermined value may be preset by the controller 250. By turning on the switch, the capacitor $C_L$ is connected to the charging unit 240, and the resonant frequency of the target resonator is changed. A value of the changed resonant frequency of the target resonator may be obtained using the following Equation 2.

$$f_2' = \frac{1}{2\pi\sqrt{L_2(C_2 + C_L)}} \qquad (2)$$

Accordingly, the resonant frequency $f_1$ of the source resonator becomes different from the resonant frequency $f_2$ of the target resonator, which causes the mutual resonance between the source resonator and the target resonator to be terminated. For example, when $f'_2$ is smaller than $f_2$ based on a Q-factor of the target resonator, a mutual resonance channel may be removed. Additionally, the power output unit 260 may transfer power used to charge the capacitor $C_2$ and the inductor $L_2$ to a load. For example, the power output unit 260 may transfer the power using a scheme suitable for the load. For example, the power output unit 260 may regulate a voltage to a rated voltage that is required by the load, and may transfer power to the load at the rated voltage.

When a value of the power used to charge the target resonator is less than a predetermined value, the controller 250 turns off the switch. When the resonant frequency $f_1$ of the source resonator becomes equal to the resonant frequency $f_2$ of the target resonator due to the turning off of the switch, the charging unit 240 recharges the target resonator with power through the mutual resonance between the source resonator and the target resonator.

During the mutual resonance between the source resonator and the target resonator, the switch is turned off. Accordingly, it is possible to prevent a transmission efficiency from being reduced due to the resonant frequency $f_1$ of the source resonator being different from the resonant frequency $f_2$ of the target resonator as a result of the switch being turned on.

The IC scheme of FIG. 2 may more easily control a point in time of capturing energy stored in a target resonator when compared to the CC scheme of FIG. 1. In the CC scheme of FIG. 1, a wireless energy reception apparatus may capture the energy in the capacitor. However, in the IC scheme of FIG. 2, energy stored in an inductor and a capacitor of a target resonator may be captured. Accordingly, a degree of freedom for the point in time of capturing energy may be improved.

To transmit power or data, a Tx end in the RI system may repeatedly charge a source resonator with energy and discharge energy through a connection to a switch. In various examples herein, a single charging and discharging of energy may be defined as a single symbol. To receive energy or data from the Tx end, an Rx end in the RI system may control a switch of the Rx end based on an operation period of a switch of the Tx end that repeatedly performs charging and discharging.

To receive power or data from the Tx end without an error, the Rx end needs to know when the switch of the Tx end is turned off, when the switch of the Tx end is turned on, when the mutual resonance is started, and when energy stored in a target resonator has a peak value. An operation of acquiring information regarding an on/off time of the switch of the Tx end, and of adjusting an on/off time of the switch of the Rx end based on the acquired information, may be defined as "time synchronization."

Hereinafter, the Tx end and the Rx end may also be referred to as the energy Tx end and the energy Rx end.

Figure 3:
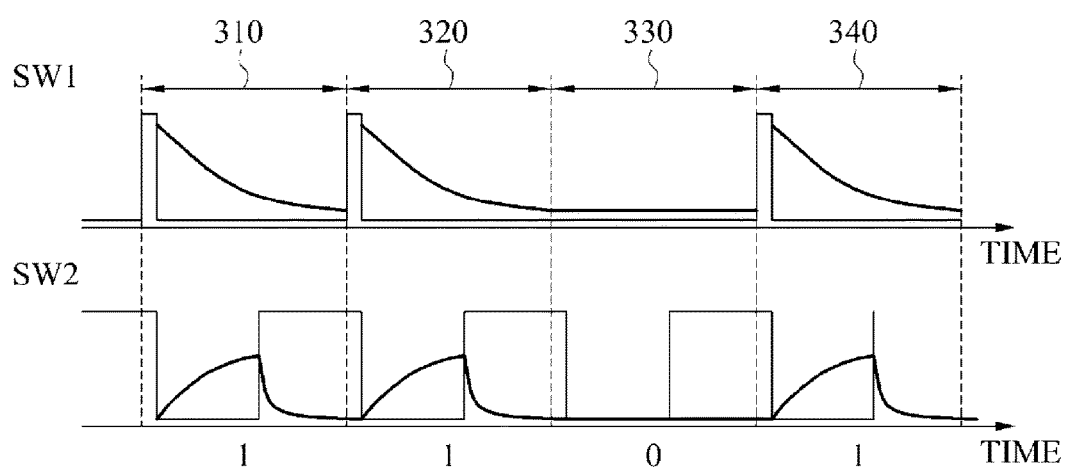
FIG. 3 illustrates examples of operations of switches of an energy transmission (Tx) end and an energy reception (Rx) end in a wireless energy transmission system.

FIG. 3 illustrates examples of operations of switches of an energy Tx end and an energy Rx end in a wireless energy transmission system.

Referring to FIG. 3, a wireless energy transmission apparatus transmits energy to a wireless energy reception apparatus by repeatedly performing charging and discharging. A single charging and discharging of energy may be defined as a single symbol. Each of periods of time 310 through 340 corresponds to a single symbol. When a switch of the wireless energy transmission apparatus is turned on, a source resonator is charged with energy. When the switch of the wireless energy transmission apparatus is turned off, the energy in the source resonator is discharged.

To transfer information, a wireless energy charging system may use a mutual resonance between a source resonator and a target resonator. For example, the Tx end may switch between states in which a mutual resonance occurs and does not occur for a predetermined time interval through an operation of supplying and not supplying energy from a power supply to the source resonator for the predetermined time interval. In particular, the Tx end may control the mutual resonance by switching a connection between the source resonator and the power supply. The Tx end may assign information to each of the states. For example, the Tx end may assign a bit "1" to the state in which the mutual resonance occurs, and assign a bit "0" to the state in which the mutual resonance does not occur. As another example, the Tx end may assign a bit "0" to the state in which the mutual resonance occurs, and assign a bit "1" to the state in which the mutual resonance does not occur. The predetermined time interval may correspond, for example, to a single symbol.

The Rx end may switch between states in which a mutual resonance occurs and does not occur through an operation of tuning and detuning a resonant frequency of the target resonator to a resonant frequency of the source resonator, for the predetermined time interval. In this example, the Rx end may assign information to each of the states. For example, the Rx end may assign a bit "1" to the state in which the mutual resonance occurs, and assign a bit "0" to the state in which the mutual resonance does not occur. As another example, the Rx end may assign a bit "0" to the state in which the mutual resonance occurs, and assign a bit "1" to the state in which the mutual resonance does not occur.

In the example of FIG. 3, the Tx end may switch the connection between the source resonator and the power supply, thereby enabling a mutual resonance to occur or not occur during each of the symbol durations 310 through 340. The Tx end may switch the connection to enable the mutual resonance to occur for the symbol durations 310, 320, and 340. The Tx end may switch the connection to enable the mutual resonance to not occur during the symbol duration 330. Accordingly, as one example as shown in FIG. 3, the Tx end may transmit a bit sequence of [1, 1, 0, 1] to the Rx end. As another example, the Tx end may transmit a bit sequence of [0, 0, 1, 0] to the Rx end.

In a scheme of transferring information in a symbol unit, symbols may be required to be synchronized first. To synchronize symbols, the Rx end or the Tx end may perform synchronization matching. For example, when the synchronization matching is performed, data may be bidirectionally transmitted between the Tx end and the Rx end by a protocol that is set in advance.

Figure 4:
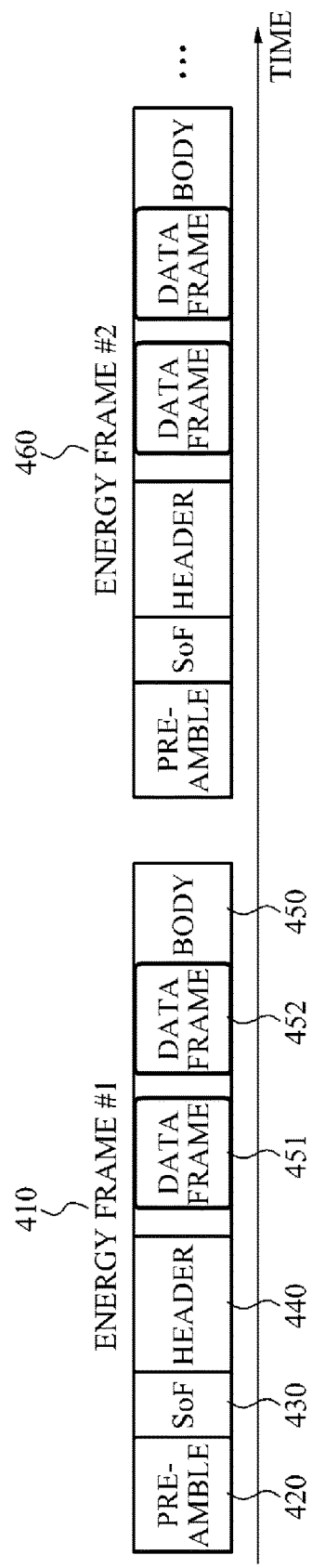
FIG. 4 illustrates an example of an energy frame.

FIG. 4 illustrates an example of an energy frame.

Referring to FIG. 4, a Tx end may transmit energy to an Rx end based on an energy frame unit. A single energy frame 410 includes a preamble 420, a start of frame (SoF) 430, an energy frame header (EFH) 440, and an energy frame body (EFB) 450. The preamble 430 may include advance information to be used for receiving the energy frame 410, for example, information on frame detection and estimation of an energy transmission channel. The SoF 430 indicates a start of the preamble 420. The EFH 440 may include control information of the energy frame 410. For example, the EFH 440 may include information on a length of the energy frame 410, information on an identification (ID) of the Tx end transmitting the energy frame 410, and information on an ID of the Rx end receiving the energy frame 410. The EFB 450 may include energy received by the Rx end. The Tx end may transmit energy to the Rx end through the EFB 450 subsequent to the EFH 440.

The EFB 450 may include data frames (DFs) 451 and 452 in a super-frame structure. Each of the DFs 451 and 452 may include a SoF, a data frame header (DFH), and a data frame body (DFB). The SoF may indicate a start of the DF 451 or 452. The DFH may include information on a length of the DF 451 or 452, information on a type of the DF 451 or 452, information on IDs of a Tx end and an Rx end exchanging the DF 451 or 452, and information on a modulation and coding scheme (MCS). The DFB may include actual data information and a frame check sequence (FCS).

In order to transmit a subsequent energy frame 460 after the transmission of the energy frame 410 is terminated, an idle state may be maintained for at least a period of time corresponding to a predefined inter energy frame space (IEFS).

Figure 5:
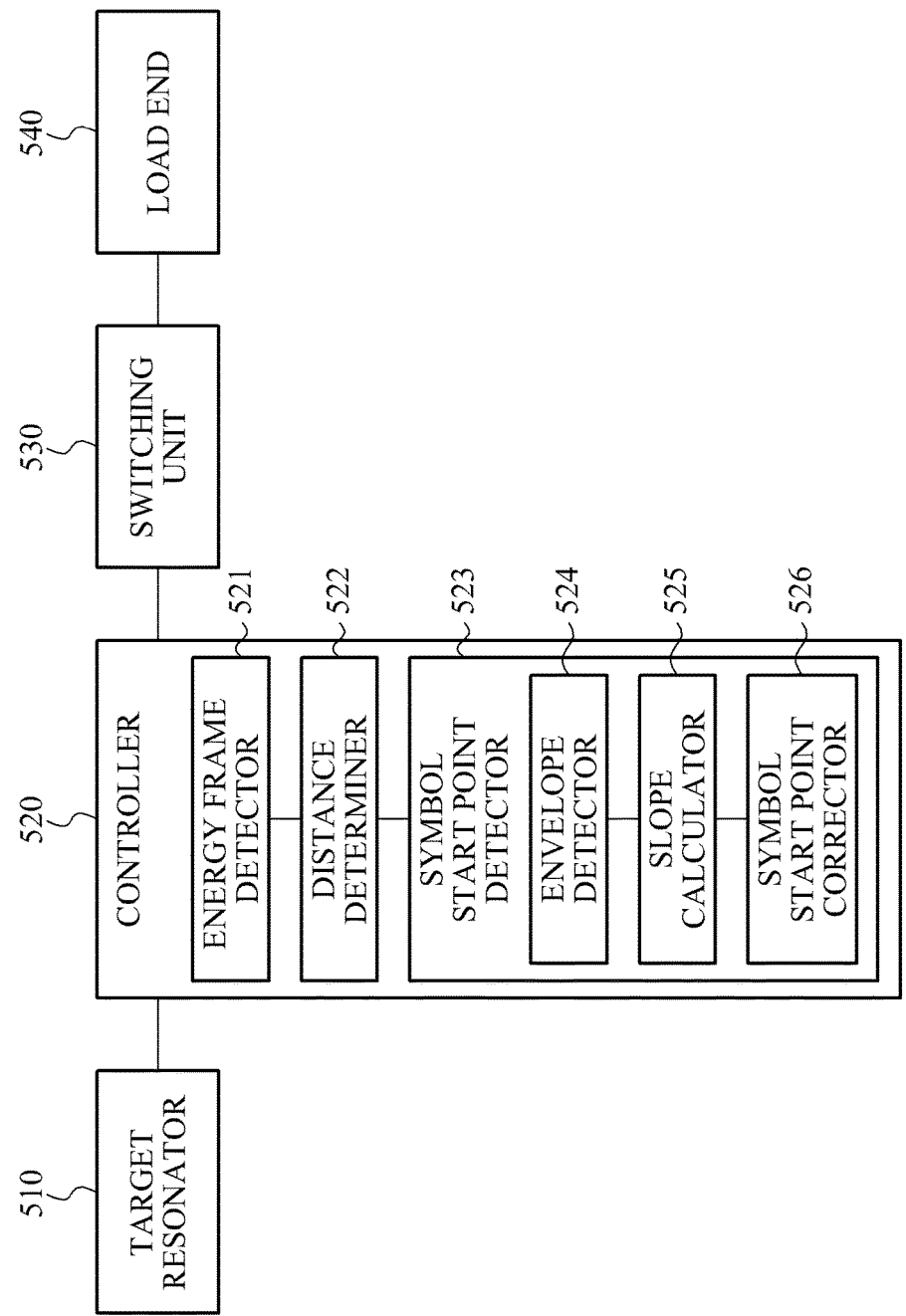
FIG. 5 illustrates an example of a wireless energy reception apparatus.

FIG. 5 illustrates an example of a wireless energy reception apparatus.

Referring to FIG. 5, the wireless energy reception apparatus includes a target resonator 510, a controller 520, a switching unit 530, and a load end 540.

The target resonator 510 receives energy through a mutual resonance with a source resonator (not shown) in a symbol duration constituting a criterion for transmitting energy from an energy Tx end to an energy Rx end.

The load end 540 includes a load and a capacitor. When the switching unit 530 is turned on, the load is charged with the energy received by the target resonator 510, and the capacitor changes a resonant frequency of the target resonator 510.

The switching unit 530 may connect the target resonator 510 to the load end 540. The switching unit 530 may be turned on or off based on a control of the controller 520. When the switching unit 530 is turned on, the target resonator 510 is connected to the load end 540. When the switching unit 530 is turned off, the target resonator is disconnected from the load end 540.

The switching unit 530 may include a diode and a transistor (not shown). The diode may be connected in series with the transistor. The diode may be connected in series between controller 520 and the transistor, or may be connected in series between the transistor and the load end 540.

The transistor and the diode may pass a DC signal from the target resonator 510 in an on state, and block an influx of an AC signal from the target resonator 510 in an off state. When the transistor is turned on, the diode rectifies an AC signal generated by the target resonator 510, and passes a DC signal. The passed DC signal is transferred to the load end 540 to charge the load end 540. In addition, the passed DC signal may be stored in the capacitor, and the capacitor may stably transfer power to the load end 540.

When the switching unit 530 is turned off, the target resonator 510 receives power from the source resonator through a mutual resonance with the source resonator. When the mutual resonance occurs, the target resonator 510 generates an AC signal. In this example, the AC signal includes an AC current signal and an AC voltage signal. When a positive component of the AC current signal of the target resonator 510 is applied to the diode, the transistor is turned off, such that the positive component of the AC current signal is blocked by the transistor and does not flow in the transistor. In addition, when a negative component of the AC current signal of the target resonator 510 is applied to the diode, the negative component of the AC current signal is blocked by the diode and does not flow in the transistor. Accordingly, when the transistor is turned off, both ends of the transistor may be completely electrically separated from one another.

In one example, when a distance between the source resonator and the target resonator 510 is determined to be relatively long, the switching unit 530 may disconnect the target resonator 510 from the load end 540. When the distance between the source resonator and the target resonator 510 is determined to be relatively short, the switching unit 530 may repeatedly connect the target resonator 510 to the load end 540 and disconnect the target resonator 510 from the load end 540 within a resonance period.

For example, the transistor may be a P-channel metal oxide-semiconductor (PMOS) transistor, and a gate input voltage applied to a gate of the PMOS transistor may be 0 V. In this example, when a voltage greater than or equal to a sum of a threshold voltage of the PMOS transistor and a threshold voltage of the diode is applied to a source of the PMOS transistor, the PMOS transistor will be in an on state. Since the switching unit 530 may be automatically turned on when a positive voltage is applied to the source of the PMOS transistor, the switching unit 530 may operate as a normally on switch. In a case in which the load end 540 is connected to the switching unit 530 and the gate input voltage applied to the gate of the PMOS transistor is 0 V, when a voltage greater than or equal to a sum of the threshold voltage of the PMOS transistor, the threshold voltage of the diode, and a voltage applied to the load end 540 is applied to the source of the PMOS transistor, the PMOS transistor will be in an on state. Accordingly, when a voltage applied to the target resonator 510 is greater than or equal to the sum of the threshold voltage of the PMOS transistor, the threshold voltage of the diode, and the voltage applied to the load end 540, the switching unit 530 will be turned on. When the voltage applied to the target resonator 510 is less than the sum of the threshold voltage of the PMOS transistor, the threshold voltage of the diode, and the voltage applied to the load end 540, the switching unit 530 will be turned off. In addition, when a voltage less than a source voltage is applied to the gate of the PMOS transistor, the switching unit 530 will be turned off.

When the distance between the source resonator and the target resonator 510 is determined to be relatively short, the source resonator and the target resonator 510 may be strongly coupled. Accordingly, the target resonator 510 may quickly receive a great amount of energy from the source resonator through a mutual resonance, the voltage applied to the source of the PMOS transistor may be greater than or equal to the sum of the threshold voltage of the PMOS transistor, the threshold voltage of the diode, and the voltage applied to the load end 540, and the switching unit 530 may be turned on in the symbol duration. When the switching unit 530 is turned on, energy stored in the target resonator 510 is transmitted to the load end 540. Accordingly, the voltage applied to the source of the PMOS transistor may be less than the sum of the threshold voltage of the PMOS transistor, the threshold voltage of the diode, and the voltage applied to the load end 540, and the switching unit 530 may be turned off. When the distance between the source resonator and the target resonator 510 is determined to be relatively short, the switching unit 530 may be repeatedly turned on and off within the resonance period.

When the distance between the source resonator and the target resonator 510 is determined to be relatively long, the source resonator and the target resonator 510 may be weakly coupled. Accordingly, within the symbol duration, energy may be applied relatively slowly from the source resonator to the target resonator 510, the voltage applied to the source of the PMOS transistor may be less than the sum of the threshold voltage of the PMOS transistor, the threshold voltage of the diode, and the voltage applied to the load end 540, and the switching unit 530 may be turned off within the resonance period.

The diode may be connected in series to the PMOS transistor. The diode may be connected in series to the source of the PMOS transistor, and connected in series to a drain of the PMOS transistor.

While the PMOS transistor is maintained to be in an on state, the PMOS transistor and the diode may pass a DC current signal from the target resonator 510.

While the PMOS transistor is maintained to be in an off state, the PMOS transistor and the diode may block an influx of an AC current signal from the target resonator 510. While the PMOS transistor is maintained to be in an off state, the target resonator 510 may generate the AC current signal due to a mutual resonance with the source resonator and a self-resonance of the target resonator 510. An influx of a minus component of the AC current signal may be blocked by the diode, and an influx of a plus component of the AC current signal may be blocked by the PMOS transistor.

The controller 520 identifies information about an on/off time of a switching unit of the Tx end, and performs time synchronization to control an on/off time of the switching unit 530 of the Rx end based on the identified information about the on/off time of the switching unit of the Tx end. When the source resonator transmits energy in an idle listening state, the controller 520 may maintain the target resonator 510 to be in an active state so that the target resonator 510 may receive energy immediately through a mutual resonance with the source resonator. The idle listening state is a state before the source resonator and the target resonator 510 mutually resonate. Maintaining the target resonator 510 to be in the active state means maintaining the target resonator 510 to be in a resonance state, which means that the switching unit 160 is turned on in the RI system of FIG. 1, and that the switch of the controller 220 is turned off in the RI system of FIG. 2.

The controller 520 includes an energy frame detector 521, a distance determiner 522, and a symbol start point detector 523.

The energy frame detector 521 detects whether an energy frame is received from the Tx end. The energy frame detector 521 detects the energy frame based on a magnitude of energy received during a first period of time.

In one example, the first period of time may be denoted by SYNC_HALF_NUM. The energy frame detector 521 calculates a sum of energy received during the first period of time. When the sum of energy received during the first period of time is greater than or equal to a predetermined reference value, the energy frame detector 521 determines that an energy frame has been received. The predetermined reference value may be greater than a noise level to prevent a noise signal from being erroneously detected as an energy frame. When the sum of energy received during the first period of time is less than the predetermined reference value, the energy frame detector 521 determines that an energy frame has not been received.

The distance determiner 522 determines whether the distance between the source resonator and the target resonator 510 is relatively short or relatively long. When an energy frame is detected by the energy frame detector 521, the distance determiner 522 determines the distance between the source resonator and the target resonator 510 based on a magnitude of energy received during a second period of time. The second period of time may include the first period of time. For example, the second period of time may be denoted by SYNC_FULL_NUM, and may include the first period of time denoted by SYNC_HALF_NUM.

When the magnitude of the energy received during the second period of time is greater than or equal to a first threshold value, the distance determiner 522 determines that the distance between the source resonator and the target resonator 510 is relatively short. When the magnitude of the energy received during the second period of time is less than the first threshold value, the distance determiner 522 determines that the distance between the source resonator and the target resonator 510 is relatively long.

In one example, the distance determiner 522 determines the distance between the source resonator and the target resonator 510 based on a magnitude of energy received at a rear or tail end, i.e., during an end portion, of the second period of time. For example, when the first period of time is denoted by SYNC_HALF_NUM and the second period of time includes the first period of time and is denoted by SYNC_FULL_NUM, the distance determiner 522 determines the distance between the source resonator and the target resonator 510 based on a magnitude of energy received during a remaining period of time of the second period of time denoted by SYNC_FULL_NUM that excludes the first period of time denoted by SYNC_HALF_NUM.

The symbol start point detector 523 detects a start point of a symbol within each symbol duration to perform time synchronization between the energy Tx end and the energy Rx end. In this example, the symbol start point detector 523 detects the start point of the symbol based on the energy received during the second period of time.

The symbol start point detector 523 detects the start point of the symbol based on the distance between the source resonator and the target resonator 510. When the distance between the source resonator and the target resonator 510 is determined to be relatively long, an envelope detector 524 included in the symbol start point detector 523 detects an envelope of a received signal. In this example, the envelope detector 524 detects the envelope by sampling a modulated signal corresponding to a waveform of the received energy. A slope calculator 525 included in the symbol start point detector 523 calculates a slope of the detected envelope. The slope calculator 525 may calculate a slope between two points having a predetermined gap in the detected envelope. In addition, the slope calculator 525 may calculate a slope of a tangent at each point of the detected envelope.

The slope of the envelope will have a maximum value at a point in time at which a mutual resonance between the source resonator transmitting energy and the target resonator 510 receiving the energy is initiated. The symbol start point detector 523 may estimate the start point of the symbol using the following Equation 3.

$$\text{signal\_start\_point} = \max\{\text{envelope}(i+\text{gap}) - \text{envelope}(i)\} \quad (3)$$

In Equation 3, signal_start_point denotes a start point of a symbol, or a start point of a mutual resonance. i denotes a point of an envelope, and gap denotes a predetermined gap between two points. signal_start_point may be estimated to be the point i at which a slope between the two points having the predetermined gap in the envelope has a maximum value. Accordingly, the symbol start point detector 523 may detect a point in time at which the calculated slope of the envelope has a maximum value to be the start point of the symbol.

When the distance between the source resonator and the target resonator 510 is determined to be relatively short, the symbol start point detector 523 estimates a first point in time at which a magnitude of the energy received by the target resonator 510 is equal to a second threshold value to be the start point of the symbol.

When the distance between the source resonator and the target resonator 510 is determined to be relatively short, the target resonator 510 may quickly receive a great amount of energy from the source resonator, and the switching unit 530 may be repeatedly turned on and off within the resonance period. In this example, a waveform of the envelope may differ from a waveform of an envelope for a case in which the distance between the source resonator and the target resonator 510 is determined to be relatively long. Accordingly, if the slope of the envelope is used to detect the start point of the symbol, inaccurate results may be obtained. When the source resonator and the target resonator 510 mutually resonate, a great amount of energy may be transmitted and received, as compared to a case in which the source resonator and the target resonator 510 do not mutually resonate. The symbol start point detector 523 may set a magnitude of energy at a point in time at which the mutual resonance occurs to be the second threshold value, and estimate a point in time at which a magnitude of the energy received by the target resonator 510 is equal to the second threshold value to be the start point of the symbol.

In addition, the symbol start point detector 523 may further include a symbol start point corrector 526. The symbol start point corrector 526 may correct the detected start point of the symbol by a predetermined period of time. For example, when the first point in time at which the magnitude of the energy received by the target resonator 510 is equal to the second threshold value is 3 µs, the symbol start point detector 523 may estimate the start point of the symbol to be 3 µs. However, in some cases, depending on the environment of the source resonator and the target resonator 510, the mutual resonance may occur before the magnitude of the energy received by the target resonator 510 is equal to the second threshold value. Accordingly, the symbol start point detector 523 may detect the start point of the symbol more accurately by correcting the detected start point of the symbol using the symbol start point corrector 526 to be a point in time that is earlier than the detected start point of the symbol by a period of time corresponding to a difference between the detected start point of the symbol and the point in time at which the mutual resonance occurs. In other cases, depending on the environment of the source resonator and the target resonator 510, the mutual resonance may occur after the magnitude of the energy received by the target resonator 510 is equal to the second threshold value. Accordingly, the symbol start point detector 523 may detect the start point of the symbol more accurately by correcting the detected start point of the symbol using the symbol start point corrector 526 to be a point in time that is later than the detected start point of the symbol by a period of time corresponding to a difference between the detected start point of the symbol and the point in time at which the mutual resonance occurs.

Figure 6:
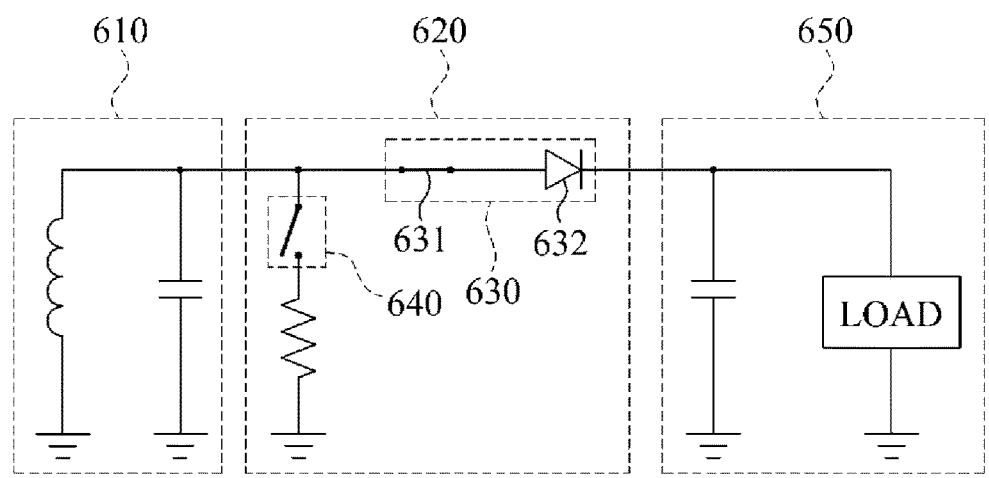
FIG. 6 illustrates an example of a wireless energy reception apparatus.

FIG. 6 illustrates an example of a wireless energy reception apparatus.

Referring to FIG. 6, the wireless energy reception apparatus includes a target resonator 610, a controller (not shown), a switching unit 620, and a load end 650. The load end 650 includes a capacitor and a load. The switching unit 620 includes a first switch 630 and a second switch 640. Although the second switch 640 is illustrated in FIG. 6 as being included in the wireless energy reception apparatus, the second switch 640 may be omitted from the wireless energy reception apparatus. The first switch 630 includes a PMOS transistor 631 and a diode 632. The second switch 640 may be an N-channel metal-oxide-semiconductor (NMOS) transistor.

A gate input voltage applied to a gate of the PMOS transistor 631 may be 0 V. In this example, when a voltage greater than or equal to a sum of a threshold voltage of the PMOS transistor 631, a threshold voltage of the diode 632, and a voltage applied to the load end 650 is applied to a source of the PMOS transistor 631, the PMOS transistor 631 will be in an on state. Accordingly, the first switch 630 may maintain a normally on state. When the voltage greater than or equal to the sum of the threshold voltage of the PMOS transistor 631, the threshold voltage of the diode 632, and the voltage applied to the load end 650 is applied to the target resonator 610, energy stored in the target resonator 610 may be transferred to the load end 650. Accordingly, the wireless energy reception apparatus may reduce a reception standby power, even in an idle listening state. Conversely, when a gate input voltage applied to a gate of the NMOS transistor is 0 V, the NMOS transistor may be in an off state, and thus the second switch 640 may maintain a normally off state.

When a distance between the source resonator and the target resonator 610 is determined to be relatively long, the target resonator 610 may receive a relatively low energy, and thus the first switch 630 may be turned off. In this example, a symbol start point detector included in the controller detects an envelope of a received signal, and calculates a slope of the detected envelope. The controller detects a point in time at which the calculated slope of the envelope has a maximum value to be a start point of a symbol.

When the distance between the source resonator and the target resonator 610 is determined to be relatively short, the target resonator 610 may receive a great amount of energy relatively quickly, and thus the first switch 630 may be repeatedly turned on and off within a resonance period. In this example, the symbol start point detector included in the controller detects a first point in time at which a magnitude of the energy received by the target resonator 610 is equal to a second threshold value to be the start point of the symbol. In one example, the symbol start point detector may include a symbol start point corrector that may correct the detected start point of the symbol by a predetermined period of time.

When a symbol duration is terminated and residual energy exists in the wireless energy reception apparatus, the second switch 640 may be turned on to remove the residual energy through a ground (GND).

FIG. 7 illustrates an example of operation of an energy frame detector and a distance determiner of a wireless energy reception apparatus.

Referring to FIG. 7, when the wireless energy reception apparatus receives signals 711 through 713 or energy, the energy frame detector detects energy frames. When a first period of time 721 is SYNC_HALF_NUM, the energy frame detector detects energy frames by calculating a sum of energy received within the first period of time 721 of SYNC_HALF_NUM, and comparing the calculated sum with a predetermined reference value (not shown) greater than a noise level to prevent a noise signal from being erroneously detected as an energy frame. In this example, a speed at which the energy frame detector detects the energy frames may vary depending on a magnitude of the received energy. For example, in a case of the first signal 711, since a size of the first signal 711 is relatively great, a sum of received energy reaches the predetermined reference value quickly. In a case of the third signal 713, since a size of the third signal 713 is relatively small, a sum of received energy reaches the predetermined reference value slowly. Accordingly, the energy frame detector detects an energy frame relatively quickly with respect to the first signal 711, and detects an energy frame relatively slowly with respect to the third signal 713.

When the energy frame is detected, the distance determiner determines whether a distance between a source resonator and a target resonator is relatively long or relatively short. In a case in which a second period of time 722 is SYNC_FULL_NUM, the distance determiner determines that the distance between the source resonator and the target resonator is relatively short when a size of a signal received during the second period of time 722 of SYNC_FULL_NUM is greater than or equal to a first threshold value corresponding to the threshold shown in FIG. 7, and determines that the distance between the source resonator and the target resonator is relatively long when the size of the signal received during the second period of time 722 of SYNC_FULL_NUM is less than the first threshold value. For example, in a case of the first signal 711, since the size of the first signal 711 received during the second period of time 722 of SYNC_FULL_NUM is greater than the first threshold value, the distance determiner determines that the distance between the source resonator and the target resonator is relatively short. In cases of the second signal 712 and the third signal 713, since the sizes of the second signal 712 and the third signal 713 received during the second period of time 722 of SYNC_FULL_NUM are less than the first threshold value, the distance determiner determines that the distance between the source resonator and the target resonator is relatively long.

In addition, the distance determiner determines the distance between the source resonator and the target resonator based on a magnitude of energy received at a rear or tail end, i.e., during an end portion, of the second period of time 722 of SYNC_FULL_NUM.

Figure 8A:
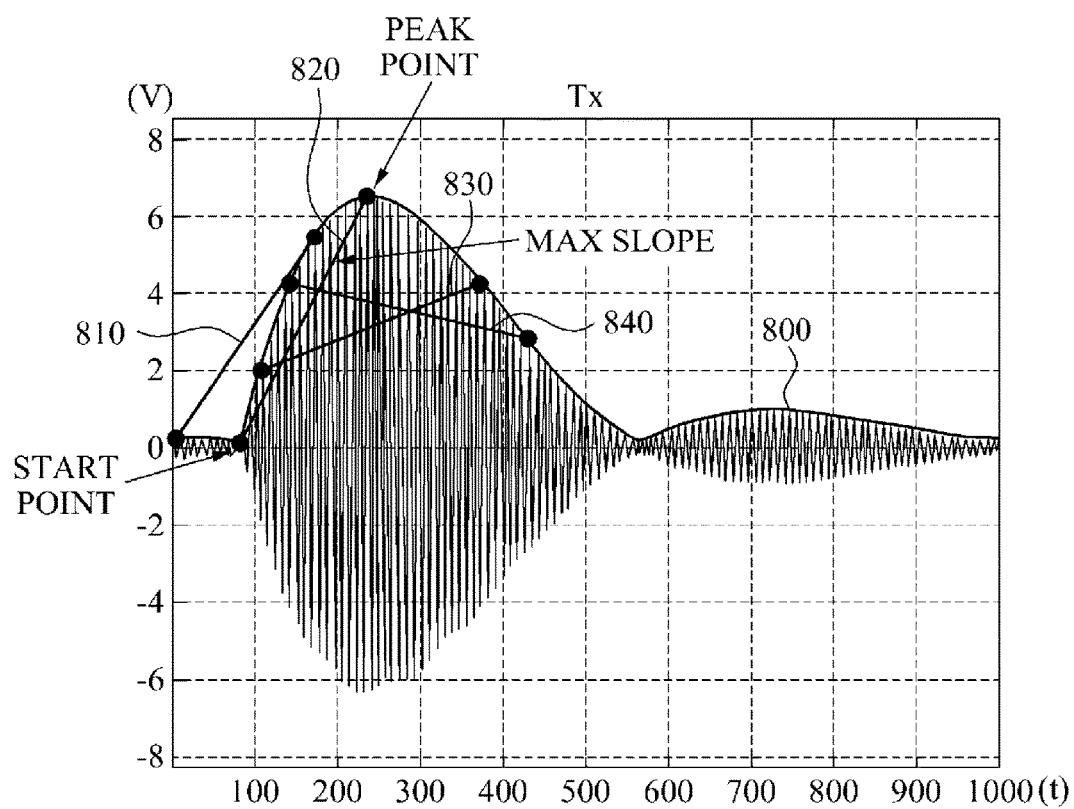
FIG. 8A illustrates an example of operation of an envelope of a received signal when a distance between a source resonator and a target resonator is determined to be relatively long in a wireless energy reception apparatus.

FIG. 8A illustrates an example of an envelope 800 of a received signal when a distance between a source resonator and a target resonator is determined to be relatively long in a wireless energy reception apparatus.

Referring to FIG. 8A, a symbol start point detector calculates a slope between two points having a predetermined gap in the envelope 800 detected from a waveform of the received signal. In FIG. 8A, four slopes 810, 820, 830, and 840 are illustrated. Comparing the four slopes 810, 820, 830, and 840, a slope has a maximum value at a start point at which a source resonator and a target resonator in an RI system start to mutually resonate. When the slope of the envelope 800 has a maximum value, the first point of the two points having the predetermined gap is estimated to be the start point of a symbol.

Energy stored in the target resonator may be captured at a peak point at which the stored energy has a peak value. The source resonator and the target resonator mutually resonate between the start point of the symbol and the peak point.

Figure 8B:
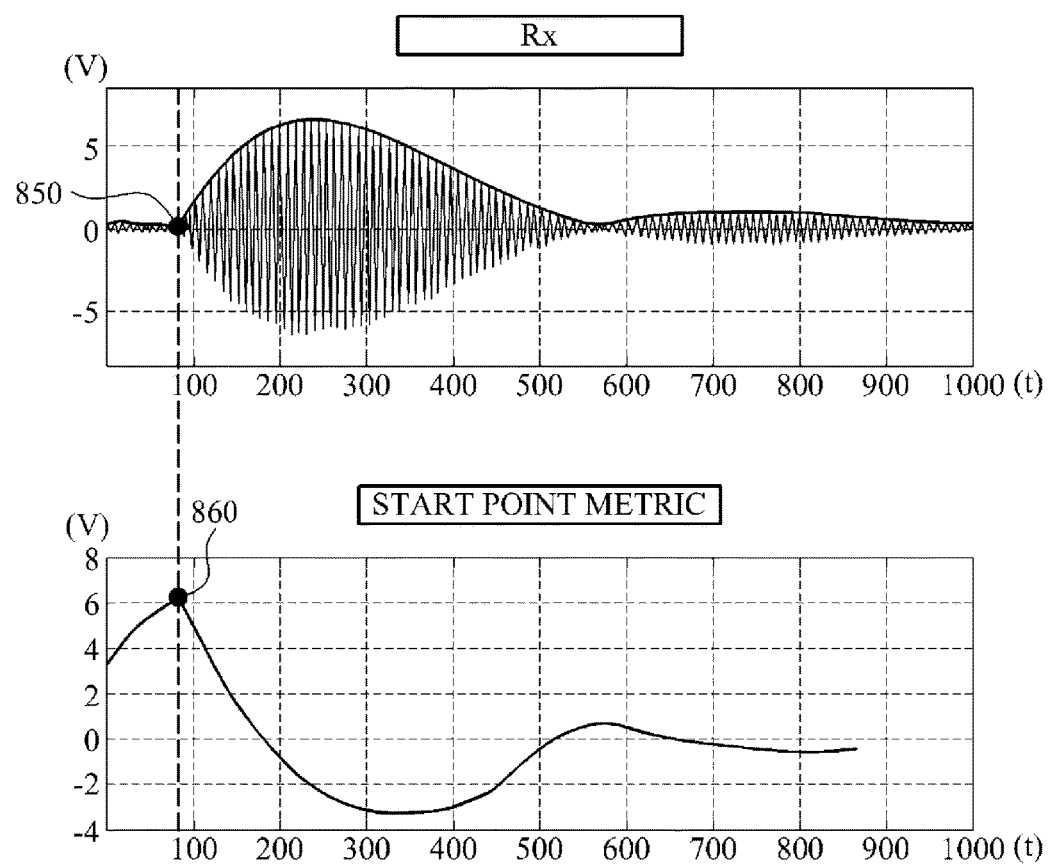
FIG. 8B illustrates examples of an envelope of a received signal and a slope at each point of the envelope.

FIG. 8B illustrates examples of an envelope of a received signal and a slope at each point of the envelope for the case of FIG. 8A.

Referring to FIG. 8B, a point 850 at which a mutual resonance is initiated in the envelope of a waveform of a voltage applied to a target resonator of an energy Rx end coincides with a point 860 at which a slope of the envelope has a maximum in a start point metric. The point 860 is estimated to be the start point 850 of a symbol. The start point metric is a graph illustrating values of slopes between two points having a predetermined gap in the envelope 800 of FIG. 8A.

Figure 9:
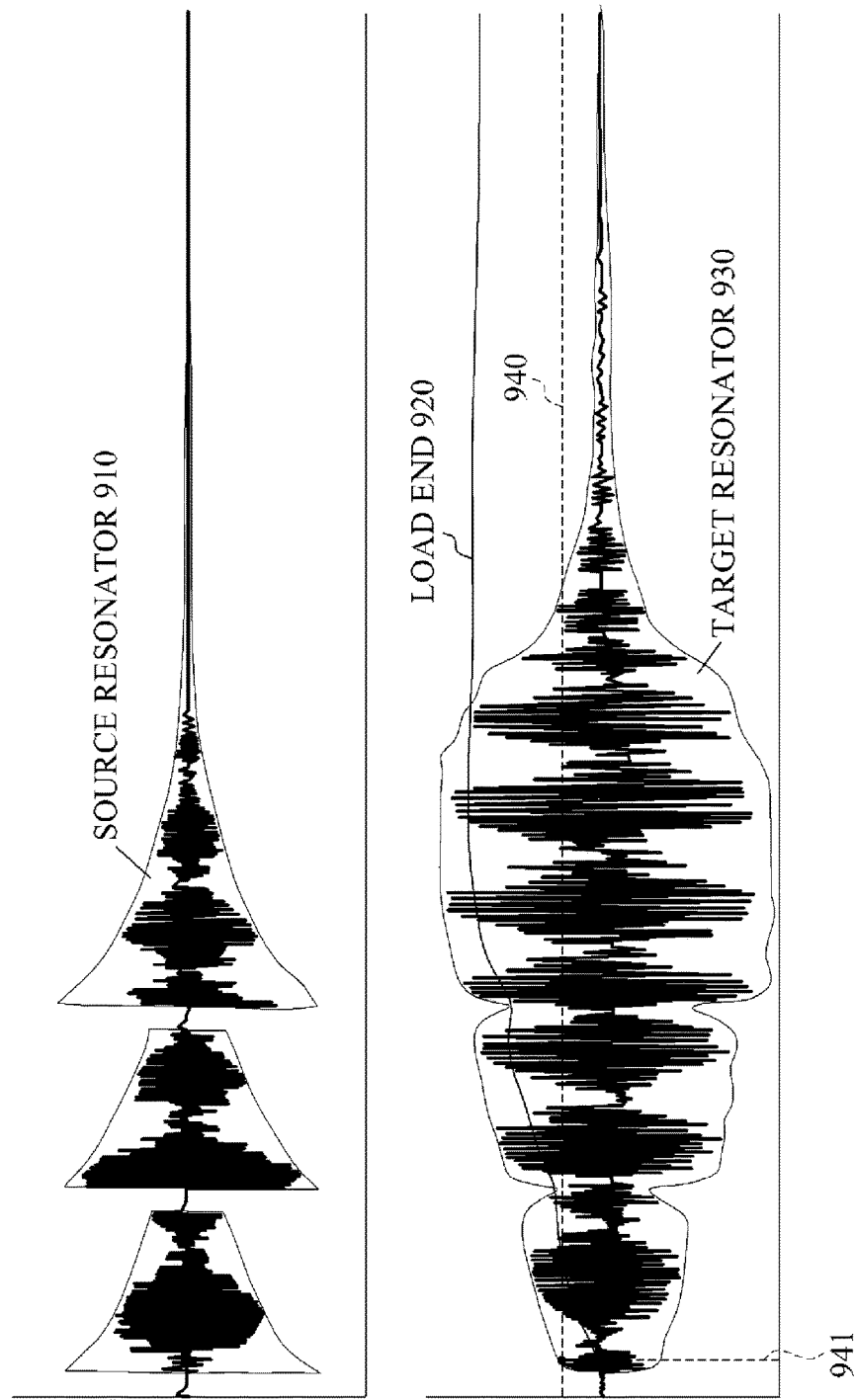
FIG. 9 illustrates an example of voltage waveforms of a source resonator, a target resonator, and a load end when a distance between the source resonator and the target resonator is determined to be relatively short in a wireless energy reception apparatus.

FIG. 9 illustrates an example of voltage waveforms of a source resonator 910, a target resonator 930, and a load end 920 when a distance between the source resonator 910 and the target resonator 930 is determined to be relatively short in a wireless energy reception apparatus.

Referring to FIG. 9, when the distance between the source resonator 910 and the target resonator 930 is determined to be relatively short, a switching unit of the wireless energy reception apparatus is repeatedly turned on and off within a resonance period. When the switching unit is turned off, the source resonator 910 transmits energy to the target resonator 930, and the target resonator 930 receives the energy from the source resonator 910. When the target resonator 930 receives the energy, a voltage applied to the target resonator 930 increases. When the voltage applied to the target resonator is equal to a sum of a threshold voltage of the switching unit and a voltage applied to the load end 920, the switching unit is turned on.

When the switching unit is turned on, the source resonator 910 suspends the transfer of the energy to the target resonator 930, and the target resonator 930 transfers the energy to the load end 920. Accordingly, a voltage applied to the load end 920 increases and the voltage applied to the target resonator 930 decreases. When the voltage applied to the target resonator 930 is less than the sum of the threshold voltage of the switching unit and the voltage applied to the load end 920, the switching unit is turned off. When the turning on and off is performed repeatedly, the source resonator 910, the target resonator 930, and the load end 920 repeat a series of the foregoing operations.

In one example, when a second threshold value 940 is set, a symbol start point detector of a controller (not shown) estimates a first point in time at which the voltage applied to the target resonator 930 is equal to the second threshold value 940 to be a start point of a symbol. Since the voltage applied to the target resonator 930 is equal to the second threshold value 940 for the first time at a point in time 941, the symbol start point detector estimates the point in time 941 to be the start point of the symbol.

Figure 10:
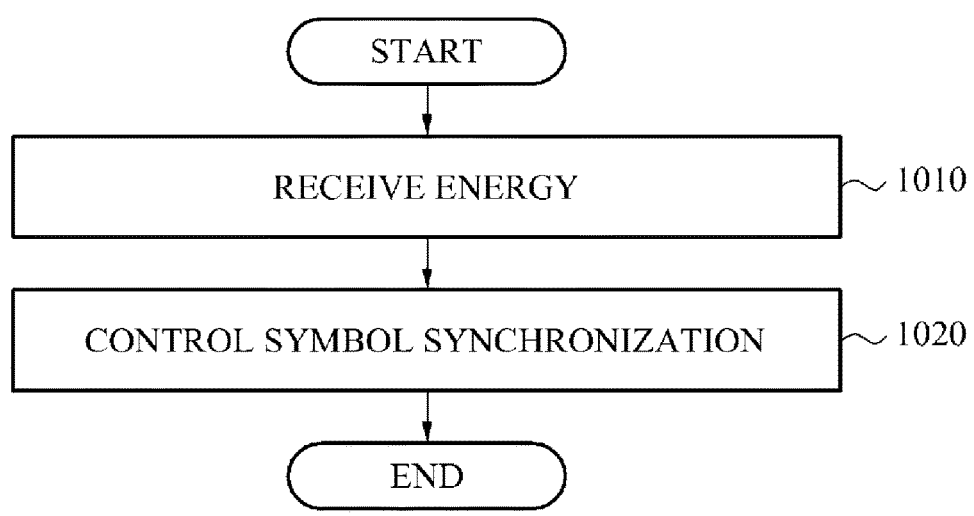
FIG. 10 illustrates an example of a wireless energy reception method.

FIG. 10 illustrates an example of a wireless energy reception method.

Referring to FIG. 10, in 1010, energy is received based on a frame-by-frame basis from an energy Tx end through a resonance between a source resonator and a target resonator in a symbol duration constituting a criterion for transmitting energy from the energy Tx end to an energy Rx end.

In 1020, symbol synchronization is controlled by detecting a start point of a symbol based on a distance between the source resonator and the target resonator.

Descriptions provided with reference to FIGS. 1 through 9 may be applied to the wireless energy reception method of FIG. 10 and, thus duplicated descriptions will be omitted for conciseness.

The controller 520, the energy frame detector 521, the distance determiner 522, the symbol start point detector 523, the envelope detector 524, the slope calculator 525, and the symbol start point corrector 526 illustrated in FIG. 5 described above that perform the operations illustrated in FIGS. 7, 8A, 8B, 9, and 10 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component or for performing the methods described above may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless energy reception apparatus comprising:
   a target resonator configured to receive energy on a frame-by-frame basis from an energy transmission end through a resonance with a source resonator in a symbol duration constituting a criterion for transmitting energy from the energy transmission end to an energy reception end;
   a load end configured to receive power from the target resonator;
   a switching unit configured to connect the target resonator to the load end, and disconnect the target resonator from the load end; and
   a controller configured to control symbol synchronization by detecting a start point of a symbol based on a distance between the source resonator and the target resonator.

2. The apparatus of claim 1, wherein the controller comprises:
   an energy frame detector configured to detect an energy frame based on a magnitude of energy received during a first period of time;
   a distance determiner configured to determine the distance between the source resonator and the target resonator based on a magnitude of energy received during a second period of time in response to the energy frame being detected; and
   a symbol start point detector configured to detect the start point of the symbol based on the distance between the source resonator and the target resonator.

3. The apparatus of claim 2, wherein the distance determiner is further configured to:
   determine that the distance between the source resonator and the target resonator is relatively short in response to the magnitude of the energy received during the second period of time being greater than or equal to a first threshold value; and
   determine that the distance between the source resonator and the target resonator is relatively long in response to the magnitude of the energy received during the second period of time being less than the first threshold value.

4. The apparatus of claim 3, wherein the symbol start point detector is further configured to estimate a first point in time at which a magnitude of the energy received by the target resonator is equal to a second threshold value to be the start point of the symbol in response to the distance determiner determining that the distance between the source resonator and the target resonator is relatively short.

5. The apparatus of claim 3, wherein the switching unit is further configured to:
   disconnect the target resonator from the load end in response to the distance determiner determining that the distance between the source resonator and the target resonator is relatively long; and
   repeatedly connect the target resonator to the load end and disconnect the target resonator from the load end within the symbol duration in response to the distance determiner determining that the distance between the source resonator and the target resonator is relatively short.

6. The apparatus of claim 2, wherein the distance determiner is further configured to determine the distance between the source resonator and the target resonator based on a magnitude of energy received during an end portion of the second period of time.

7. The apparatus of claim 2, wherein the symbol start point detector comprises a symbol start point corrector configured to correct the detected start point of the symbol by a predetermined period of time.

8. The apparatus of claim 2, wherein the symbol start detector comprises:
an envelope detector configured to detect an envelope of the energy received by the target resonator; and
a slope calculator configured to calculate a slope of the detected envelope;
wherein the symbol start point detector is further configured to estimate a point in time at which the calculated slope of the envelope has a maximum value to be the start point of the symbol in response to the distance determiner determining that the distance between the source resonator and the target resonator is relatively long.

9. The apparatus of claim 2, wherein the symbol start point detector is further configured to detect the start point of the symbol based on the energy received during the second period of time.

10. The apparatus of claim 2, wherein the energy frame comprises:
a preamble comprising advance information to be used for receiving the energy frame by the energy reception end;
a start of frame (SoF) indicating a start of the preamble;
an energy frame header (EFH) comprising control information;
an energy frame body (EFB) comprising energy received by the energy reception end; and
a data frame (DF) inserted in the EFB in a super-frame structure.

11. The apparatus of claim 2, wherein the second period of time comprises the first period.

12. The apparatus of claim 1, wherein the load end comprises:
a load configured to be charged with the energy received by the target resonator in response to the switching unit connecting the target resonator to the load end; and
a capacitor configured to change a resonant frequency of the target resonator in response to the switching unit connecting the target resonator to the load end.

13. A wireless energy receiving method comprising:
receiving energy on a frame-by-frame basis from an energy transmission end through a resonance between a source resonator and a target resonator in a symbol duration constituting a criterion for transmitting energy from the energy transmission end to an energy reception end; and
controlling symbol synchronization by detecting a start point of a symbol based on a distance between the source resonator and the target resonator.

14. The method of claim 13, wherein the controlling of the symbol synchronization comprises:
detecting an energy frame based on a magnitude of energy received during a first period of time;
determining the distance between the source resonator and the target resonator based on a magnitude of energy received during a second period of in response to the energy frame being detected; and
detecting the start point of the symbol based on the distance between the source resonator and the target resonator.

15. The method of claim 14, wherein the determining of the distance comprises:
determining that the distance between the source resonator and the target resonator is relatively short in response to the magnitude of the energy received during the second period of time being greater than or equal to a first threshold value; and
determining that the distance between the source resonator and the target resonator is relatively long in response to the magnitude of the energy received during the second period of time being less than the first threshold value.

16. The method of claim 15, wherein the detecting of the start point of the symbol comprises estimating a first point in time at which a magnitude of the energy received by the target resonator is equal to a second threshold value to be the start point of the symbol in response to the distance between the source resonator and the target resonator being determined to be relatively short.

17. The method of claim 15, further comprising:
detecting an envelope of the energy received by the target resonator; and
calculating a slope of the detected envelope;
wherein the detecting of the start point of the symbol comprises estimating a point in time at which the calculated slope of the envelope has a maximum value to be the start point of the symbol in response to the distance between the source resonator and the target resonator being determined to be relatively long.

18. The method of claim 14, wherein the determining of the distance comprises determining the distance between the source resonator and the target resonator based on a magnitude of energy received during an end portion of the second period of time.

19. The method of claim 14, wherein the detecting of the start point of the symbol comprises correcting the detected start point of the symbol by a predetermined period of time.

20. The method of claim 14, wherein the detecting of the start point of the symbol comprises detecting the start point of the symbol based on the energy received during the second period of time.

21. A wireless energy reception apparatus comprising:
a target resonator configured to be charged by receiving energy in frame units through a resonance with a source resonator; and discharged by transferring energy to a load, a single charging and discharging of the target resonator constituting a single symbol; and
a controller configured to detect a start point of a symbol based on a distance between the source resonator and the target resonator.

22. The apparatus of claim 21, wherein the controller is further configured to detect the start point of the symbol based on a first point in time at which a magnitude of the energy received by the target resonator becomes equal to a predetermined threshold in response to the distance between the source resonator and the target resonator being relatively short.

23. The apparatus of claim 21, wherein the controller is further configured to detect the start point of the symbol based on a slope of an envelope of the energy received by the target resonator in response to the distance between the source resonator and the target resonator being relatively long.

* * * * *